Aug. 13, 1940.    G. W. BINNS ET AL    2,211,685
CENTERLESS BAR GRINDER MACHINE
Filed April 6, 1939    8 Sheets—Sheet 1

INVENTOR.
GEORGE W. BINNS
BERNARD A. KEARNS
*H K Parsons*
ATTORNEY.

Aug. 13, 1940.  G. W. BINNS ET AL  2,211,685
CENTERLESS BAR GRINDER MACHINE
Filed April 6, 1939  8 Sheets-Sheet 3

INVENTOR.
GEORGE W. BINNS
BERNARD A. KEARNS
BY
A. K. Parsons
ATTORNEY.

Aug. 13, 1940.	G. W. BINNS ET AL	2,211,685
CENTERLESS BAR GRINDER MACHINE
Filed April 6, 1939	8 Sheets—Sheet 4

INVENTOR.
GEORGE W. BINNS
BERNARD A. KEARNS
BY
ATTORNEY.

Aug. 13, 1940. G. W. BINNS ET AL 2,211,685
CENTERLESS BAR GRINDER MACHINE
Filed April 6, 1939 8 Sheets-Sheet 7

INVENTOR.
GEORGE W. BINNS
BERNARD A. KEARNS
BY H. K. Parsons
ATTORNEY.

Patented Aug. 13, 1940

2,211,685

UNITED STATES PATENT OFFICE 2,211,685

CENTERLESS BAR GRINDER MACHINE

George W. Binns and Bernard A. Kearns, Cincinnati, Ohio, assignors to Cincinnati Grinders Incorporated, Cincinnati, Ohio, a corporation of Ohio Application April 6, 1939, Serial No. 266,333

16 Claims. (Cl. 51—103)

This invention relates to machine tools and more particularly to improvements in centerless grinding machines.

One of the objects of this invention is to provide an improved centerless grinder that will efficiently grind long bar stock.

Another object of this invention is to provide a centerless grinder in which the axis of the grinding throat may be work determined rather than machine determined.

Another object of this invention is to improve the method of feeding work through a centerless grinder by reducing the work feeding load on the regulating wheel; or, on the other hand, make it possible to feed heavier work pieces through the machine than would otherwise be possible for a given size of regulating wheel.

A further object of this invention is to contrive a centerless grinder in a manner to take advantage of gravity to assist feeding and rotating work during grinding.

A still further object of this invention is to provide improved means for adjustably supporting the abrasive wheels in a centerless grinder.

An additional object of this invention is to provide improved means for presenting unfinished work to the machine and for removing finished work after being ground.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 16 is a sectional view showing optional power control means for angular adjustment of the grinding and regulating wheel supports.

Figure 17 is a detail view of the power shifting mechanism for the clutch shown in Figure 16.

Figure 18 is a view of the H-slot control switch for the circuit shown in Figure 9.

Conventional centerless grinding machinery consists of various tooling and machine elements which are circumferentially arranged to form a grinding throat through which a work piece is passed for stock removal purposes. Certain of these elements, when energized, produce a complex system of forces acting on the work piece, which system may be resolved into three components. The first component acts to hold the work into engagement with a guide which maintains the work in parallel relation to the axis of the throat during its passage therethrough.

The second component produces a feeding of the work through the throat at a substantially uniform rate.

The third component causes rotation of the work relative to the grinding wheel whereby the entire cylindrical surface of the work is presented to the grinding wheel during passage of the work through the throat.

In a conventional centerless grinder the axis of the grinding throat is machine-determined, in the sense that the various elements are relatively positioned to form the throat and determine the axis thereof, while the force system maintains the work in parallel alignment with that axis while causing helical feeding thereof through the throat.

More specifically, the elements making up the grinding throat comprise a grinding wheel, a regulating wheel and some form of work guiding blade. The direction of rotation of the grinding wheel is such as to force the work against the blade and also to impart a rotational component to the work.

This, in turn, forces the work against the face of the regulating wheel, developing sufficient friction that the regulating wheel may control the rate of rotation of the work.

For practical wheel widths and considering that only line contact exists between the wheels and the work, it is apparent that the force components that can be developed have practical limitations, so that when exceedingly long work is put through the machine, the normal force components are inadequate and inefficient for effecting the desired rotation and axial feed of the work. Part of this is due to the fact that a long work piece must be supported throughout its length in axial alignment with the portion of the work going through the grinding throat and there is a certain amount of friction that must be overcome in rotating and moving the work with respect to these outboard supporting means.

Since long heavy work pieces impose such an additional load on the grinding and regulating wheels, the chief purpose of this invention is to provide a machine in which gravity will act to provide assisting gravitational components that will aid in rotating and feeding the work.

It is proposed to accomplish these objects by providing a gravity centerless grinder in which the abrasive wheels are so arranged that the portion of the work passing through the grinding throat rests entirely on the regulating wheel, thereby utilizing gravity to increase the friction between the work and the regulating wheel.

In addition, the work is supported throughout its length at a definite angle with respect to a horizontal plane so as to produce a gravitational feeding component on the work in a direction toward the grinding throat.

Unlike conventional centerless grinders, the work supporting means fixes or determines the axis of the work, while the elements which go to make up the grinding throat are adjusted to produce a grinding throat having an axis co-incident with the axis of the work. It will be evident that this differs from the usual practice in which the grinding throat is machine determined as explained supra while here the axis of the grinding throat is work determined.

Figure 1:
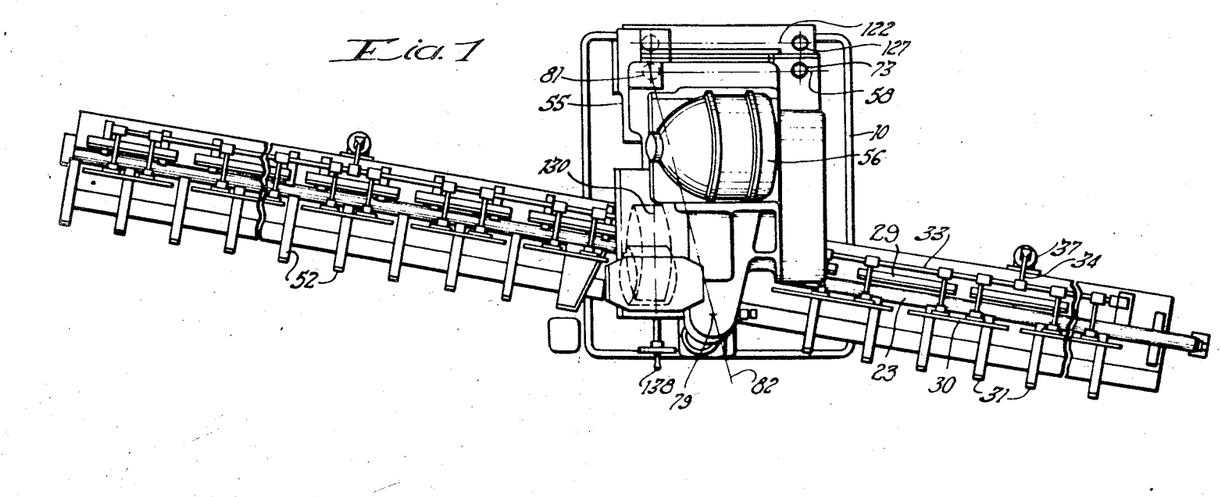
Figure 1 is a plan view of a centerless grinding machine embodying the principles of this invention.
Figure 2:
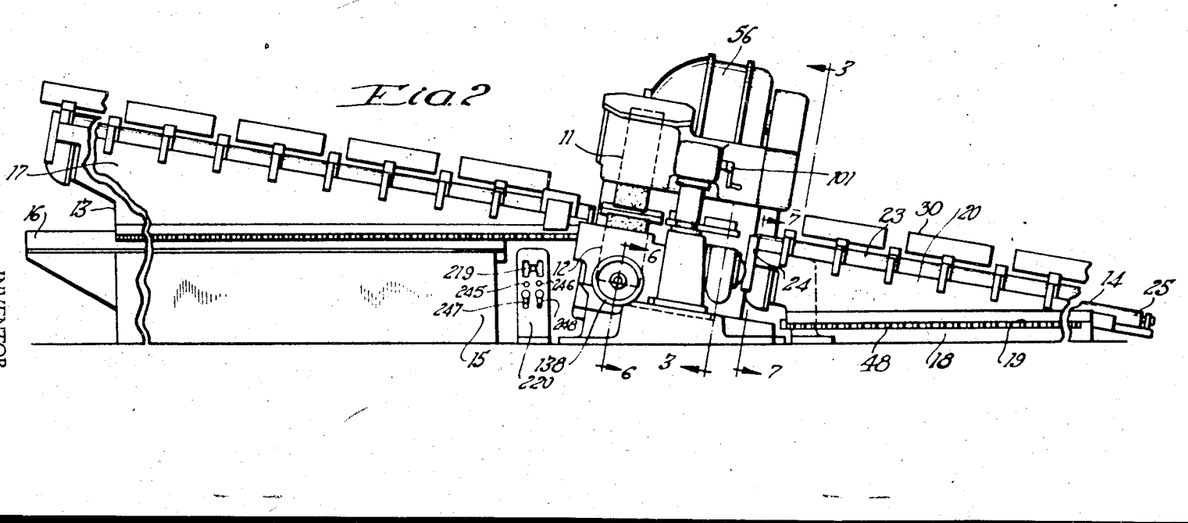
Figure 2 is a front elevation of the machine shown in Figure 1.

Referring to Figures 1 and 2 of the drawings, the reference numeral 10 indicates in general the bed of the machine proper upon which the abrasive elements 11 and 12 are supported for rotation. To the left of the bed 10, as viewed in these figures, is the lead-in work support which is indicated generally by the reference numeral 13 and which serves to supply unfinished work to the machine; and to the right of the bed 10 is the lead-out work support, indicated generally by the reference numeral 14, which receives the finished work from the machine.

Since this machine is designed for grinding long bar work it will be apparent that at certain stages in the grinding operation, opposite end portions of a work piece will be resting on the respective outboard supports, while an intermediate portion will be in the grinding throat of the machine. This is true to such an extent that the outboard supports actually determine the feeding path of the work.

Since one of the objects of this invention is to employ gravity as an agent in assisting the movement of the work, the outboard supports have a work supporting surface which is arranged at an angle to a horizontal plane.

This angle, which may be known as the gravity feed angle, has been carefully chosen in conjunction with a rotating feed drum, upon the periphery of which the work is supported, so that the static co-efficient of friction between the work and the drum is sufficient to prevent creepage of the work when the drum is stationary, but is sufficiently reduced upon rotation of the drum to impart a feeding movement to the work. Thus, the feeding of the work is controlled by starting or stopping rotation of the drum.

The lead-in work support 13 comprises a base 15 upon the top of which is formed horizontal guideways 16 for receiving an adjustable triangular work supporting carriage 17. The lead-out support 14 is similarly constructed, and comprises a base 18 having horizontal guideways 19 upon which slides a triangular-shaped work supporting carriage 20.

Figure 7:
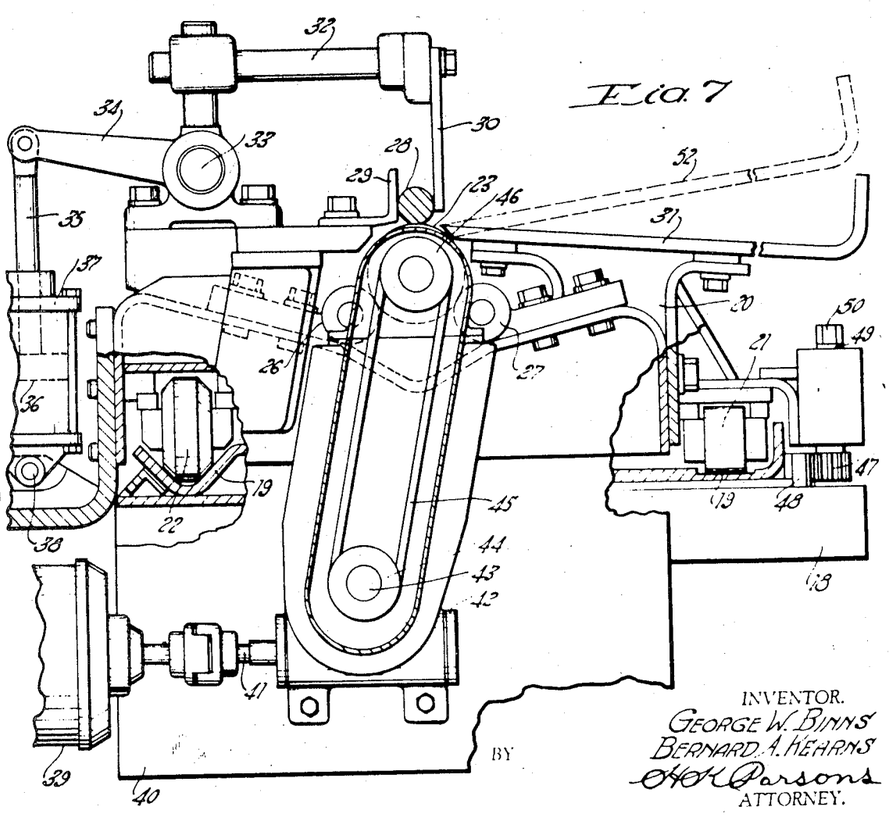
Figure 7 is a section on the line 7—7 of Figure 2, with parts broken away showing the details of the work supporting mechanism.

Referring to Figure 7, it will be noted that one of the guideways 19 is flat, while the other is a V-shaped guideway. The carriage 20 is provided with a series of flat rollers 21 which engage the flat guideway, and a series of V-shaped rollers 22 which engage the V-shaped guideway. By means of this construction, the carriage is capable of adjustment toward and from the grinding elements without changing the gravity feed angle of the work. This serves to elevate the axis of the work with respect to the machine. The supports 15 and 18 may be moved with respect to the floor to change the angle at which the work crosses the wheels.

The carriage 20 is provided with a work supporting drum 23 which is journaled in the carriage at 24 and 25, and supported at spaced intervals throughout its length by pairs of opposed rollers, such as 26 and 27 indicated in Figure 7.

This prevents the drum from sagging at any point and maintains a straight line longitudinally of the drum for maintaining line contact with a work piece, such as indicated by the reference numeral 28. The work piece rides on the periphery of the drum and is held in a position, substantially vertically over the center of rotation of the drum by lateral guides.

The lateral guides 29 on one side of the work piece are fixed to the carriage and may consist of sections of angle iron, while the guides 30 on the other side of the work piece are removable for the purpose of releasing the work so that it may roll by gravity onto the receiving rack 31. The guides 30 are pieces of plate attached to the ends of a series of arms 32 which, in turn, are secured to an oscillatable shaft 33. The shaft is provided with an operating crank 34 which is connected by a piston rod 35 to a piston 36 contained in the cylinder 37. The cylinder is pivotally supported at 38 to the carriage 20. By admitting fluid pressure, such as compressed air, to the upper end of cylinder 37 the shaft 33 may be rotated a sufficient amount to remove the lateral guides 30 and thereby release the work for gravity movement onto the receiving rack 31.

The drum 23 is driven by an electric motor 39 which is supported on an end plate 40 depending from the carriage 20. The motor shaft 41 drives through a worm and worm gear mounted in the housing 42, a pulley shaft 43 which carries a pulley 44. This pulley is connected by suitable motion transmitting means, such as the belt 45, to a second pulley 46 mounted on the end of the drum 23. It will be noted that the mechanism for rotating the drum and for actuating the removable guide are all mounted on the carriage 20 so that when the same is adjusted they will all move as a unit.

The carriage adjusting mechanism comprises a pinion 47 which is rotatably mounted on the carriage in a position to interengage a rack 48 carried by the bed. The shaft 49 to which the pinion 47 is secured has a suitably formed end 50 for receiving a socket wrench for actuation of the shaft and pinion.

The work supporting carriage 17 carries a similar mechanism for actuating the feed roll and operating the removable lateral guides. The difference is that the work supporting rack members 52 are inclined toward the feed roll as shown in Figure 7 so that the lateral guides 30 in this case serve to prevent work from rolling onto the feed roll, as well as acting as a lateral guide for the single work piece that is on the roll. The carriage 17 is also longitudinally adjustable with respect to its support 15 for purposes of providing access to the grinding wheels when they have to be changed.

In setting up the machine a long test bar is laid in the trough of the two work carriages and the carriages adjusted until the axes of the troughs are in proper alignment. This determines the axis of travel of the work through the grinding throat of the machine.

Figure 3:
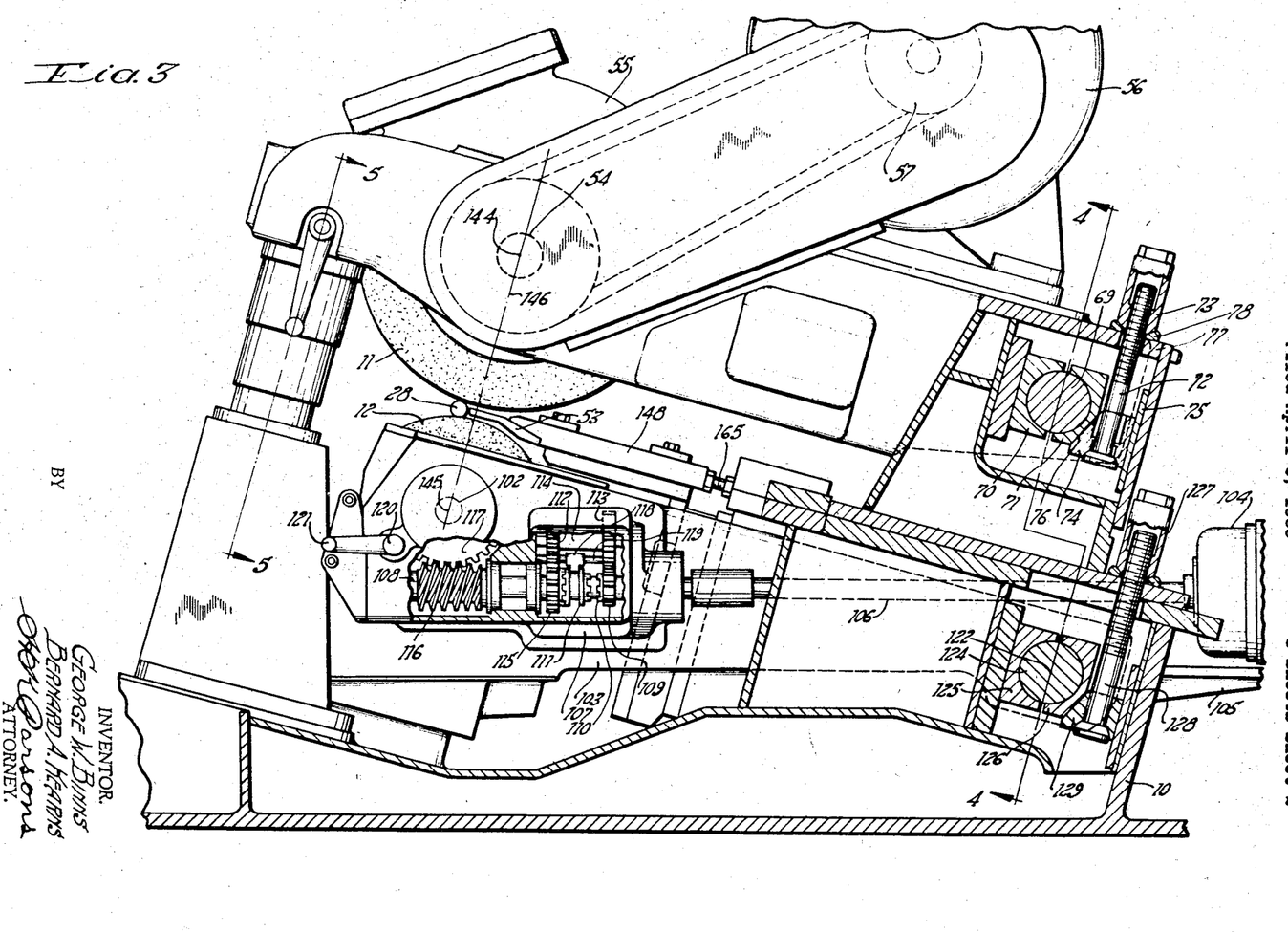
Figure 3 is a section through the machine as viewed on the line 3—3 of Figure 2.

The elements of the machine which form the grinding throat consist of the grinding wheel 11, the opposed regulating wheel 12, and a work thrust blade which is indicated by the reference numeral 53 in Figure 3.

The grinding wheel is attached to the end of spindle 54 which is journaled in the wheel head 55. This head carries an electric motor 56 which is connected by a belt and pulley drive, indicated generally by the reference numeral 57 to the spindle 54. The wheel head 55 has a three-point support with the bed of the machine.

Figure 4:
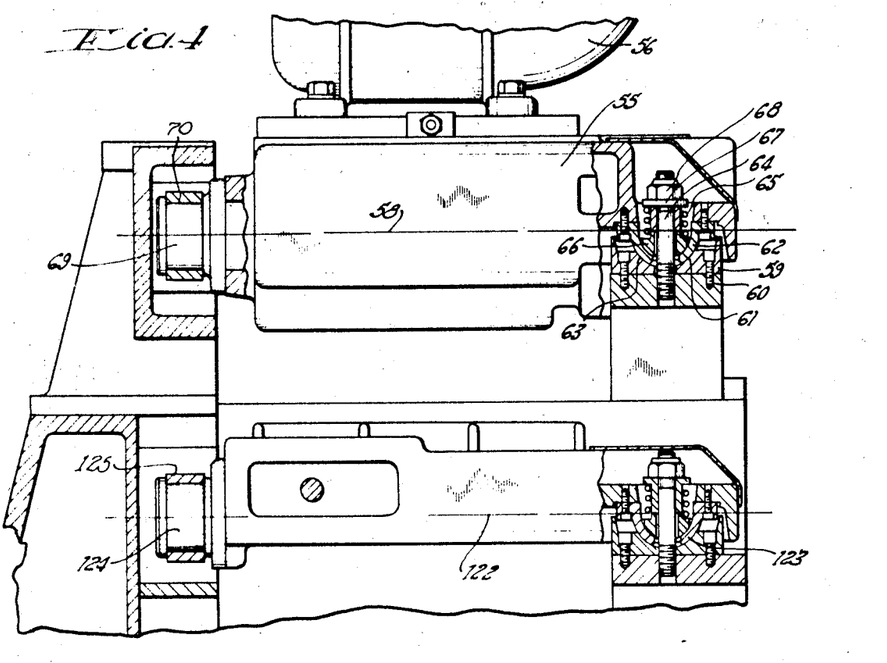
Figure 4 is a section on the line 4—4 of Figure 3 showing the manner of trunnioning the abrasive wheel supports for angular adjustment in one plane.
Figures 8, 9:
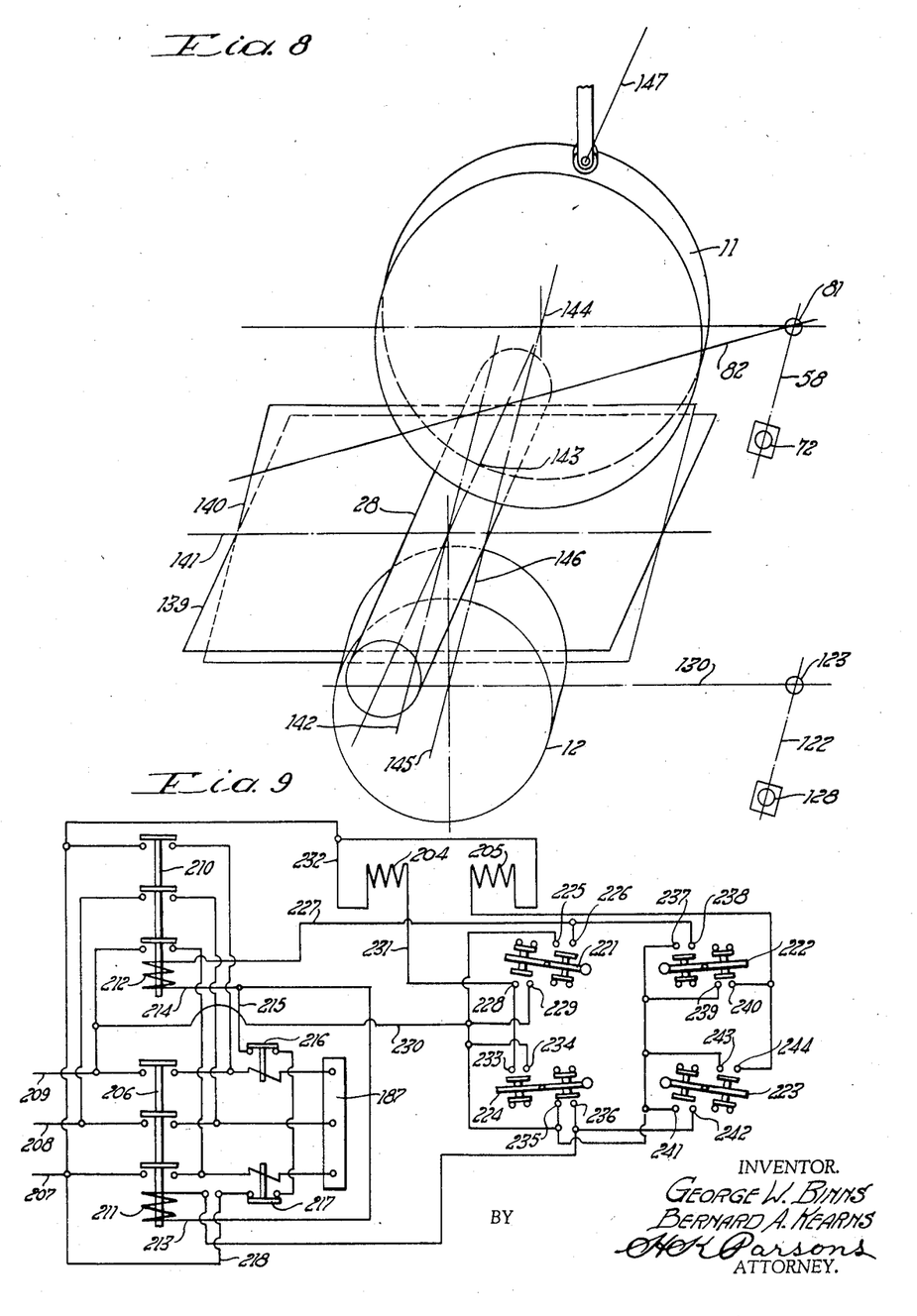
Figure 8 is a diagrammatic view showing the angular relationship of the grinding wheels and the work with respect to a horizontal plane.
Figure 9 is a diagram of an electrical control circuit for angular adjustment of the abrasive wheel supports.

The axis 58, Figures 4 and 8, located at the rear of the wheel head 55 terminates in two points of support. As shown in Figure 4, one of the points comprises a universal joint which is anchored to the bed 10 of the machine. This joint includes a plate 59 which is secured to the bed 10 by suitable bolts 60 and provided with a hemi-spherical seat 61. The underside of the support 55 carries a cooperating member 62 having a hemi-spherical face 63 which is held in contact with the seat 61 by a yieldable connection comprising a bolt 64 which is threaded in the bed 10 but has clearance passage through the member 62. A spring 65 surrounds the bolt 64 and is interposed between a member 66 which engages the member 62 and a washer 67 held in adjustable position by a nut 68 threaded on the upper end of the bolt. In this manner the member 66 resiliently holds the two parts of the universal joint in contact while permitting movement of the grinding wheel support 55 in the plane of axis 58, or for movement in a plane at right angles thereto, or about the axis 58.

At the other end of the axis 58 is a journal 69 which as shown in Figure 3, is supported in two half bearings 70 and 71 which are laterally adjustable with respect to the axis 58 by means of a threaded bolt 72 and nut 73. The bolt passes through a block 74 which has a flat face on one side by which it is guided on a plate 75, and a bevel face 76 on the other side which engages the half bearing 71. The bolt passes through the frame 77 of the machine bed and the nut 73 is threaded on the upper end of the bolt and bears against the frame 77 through an intermediate washer 78.

In the normal position of the parts, the axis 58 and the axis of the grinding wheel spindle 54 would lie in the same plane and parallel to the inclined plane of movement of the work.

Figures 5, 10:
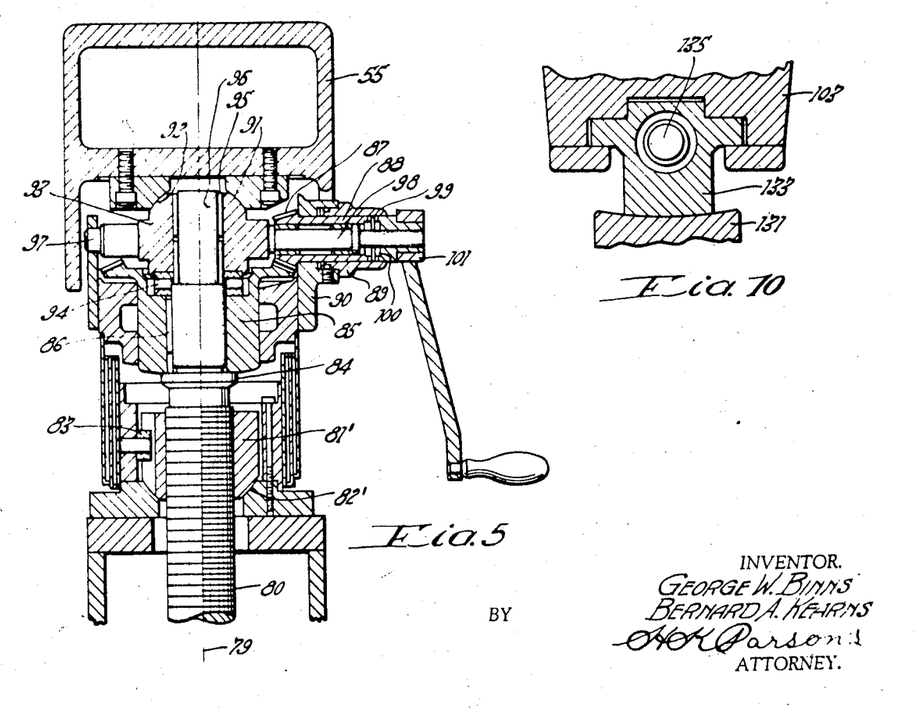
Figure 5 is a section taken on the line 5—5 of Figure 3 showing the feeding mechanism for the grinding wheel.
Figure 10 is a section on the line 10—10 of Figure 6.

The third point of support for the grinding wheel head is indicated in Figure 5 by the axis 79 of the elevating screw 80 located at the front of the machine as shown in Figure 1.

A line drawn through center 81 of the universal joint and passing through the center of the grinding wheel is perpendicular to the axis 58. Therefore, a line 82 connecting the center 81 and axis 79 will not be perpendicular to the axis 58. Rotation of the elevating screw 80 will cause movement of the grinding wheel support about the axis 58, while adjustment by the nut 73 will cause oscillation of the support about the axis 82.

The elevating screw 80 is threaded in a nut 81' which is supported on a hemi-spherical seat 82' carried by the bed 10 of the machine, and held against rotation by a key 83. A flange 84 formed on the upper end of the screw supports a bevel gear 85 which is keyed at 86 to the screw. A beveled pinion 87 intermeshes with the bevel gear and has an elongated hub 88 which is journaled in a boss 89 formed on one side of a sleeve 90. The wheel head 55 has a hemi-spherical seat 91 which rests on the hemi-spherical face 92 of a spider 93.

The weight of the grinding wheel head is transmitted through the spider 93, an anti-friction bearing 94 and hub of the gear 95 to the shoulder 84 of the elevating screw. Anti-friction needle bearings 95 are interposed between the hub of the spider and a bearing 96 formed on the upper end of the elevating screw.

The spider has lateral extending trunnions 97 and 98 which are journaled in the sleeve 90 freely movable relative to the hub of the gear 85 whereby the weight of the grinding wheel head can maintain all the parts in contact with one another. The pinion 87 has clutch teeth 99 which are engageable by clutch teeth 100 formed on the end of the manual operable crank 101 whereby upon engagement with the clutch teeth and rotation of the crank, the elevating screw 88 may be rotated relative to the nut 81. The universal joint at 82 permits the elevating screw to oscillate during upward and downward movement as determined by the grinding wheel head while the universal joint comprising the surfaces 91 and 92 permit the grinding wheel head to oscillate about the axis 82 when the screw 72 is adjusted.

The regulating wheel 12 is supported on one end of a spindle 102, Figure 3, which is journaled in a support 103. The latter has a three-point contact with the bed 10 for adjustment in two planes. The wheel is driven by an electric motor 104 supported on a bracket 105 projecting from the rear of the support 103. An elongated shaft 106 extends from the motor to a gear box 107 mounted on the support 103.

A second shaft 108 has one end journaled for free rotation in the end of the shaft 106 and the other end journaled in the support 103. The shaft 106 has a pinion 109 formed integrally on the end thereof and this pinion carries clutch teeth 110 which are engageable by clutch teeth on a shiftable clutch member 111 splined on the end of shaft 108. When these clutch teeth are engaged, the shaft 106 drives the shaft 108 directly.

The gear box contains a set of back gears 112 and 113 integral with a shaft 114. The large gear 113 intermeshes with the pinion 109 and the pinion 112 intermeshes with a large gear 115 supported for free rotation on the shaft 108. The gear 115 carries clutch teeth on the face thereof for engagement by clutch teeth on the clutch member 111 for driving the shaft 108 at a slower rate. Thus, the clutch member 111 serves as a selector of two different rotational rates of the shaft 108.

A worm 116 keyed to the shaft 108 intermeshes with a worm gear 117 fixed on the spindle 102 for transmitting rotation to the regulating wheel 12. The clutch 111 is shifted by means of shifter fork 118 supported on a shifter rod 119 that has a rack and pinion connection with a shaft 120. A manually operable crank 121 secured to the end of shaft 120 serves as means for shifting the clutch into either one of its two positions.

The regulating wheel support has an axis 122, Figures 4 and 8, at the rear end of the machine which terminates in a universal joint indicated generally by the reference numeral 123 which is similar in construction to the universal joint which forms one point of the three-point support of the grinding wheel head 55. The other end of the axis is in the form of a journal 124 which is rotatably supported in two half bearings 125 and 126 as indicated in Figure 3. These two half bearings are laterally adjustable as a unit by means of the rotatable nut 127 and elevating screw 128. The screw 128 carries a bevel block 129 which engages the underside of the half bearing 126 for raising or lowering the end of the axis 122. It will now be apparent that the regulating wheel support may be moved about the universal joint 123 in a plane determined by the axis 122 to vary the plane of rotation of the regulating wheel.

Figure 6:
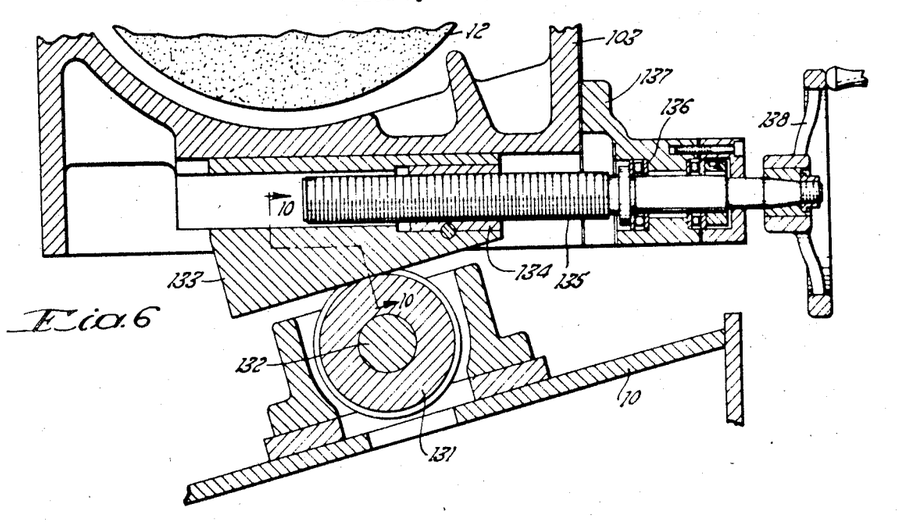
Figure 6 is a detail section on the line 6—6 of Figure 2 showing the adjusting mechanism for the regulating wheel.

The third point of support for the regulating wheel structure is shown in Figure 6, and this point of support lies on an axis 130 which is perpendicular to the axis 122. The structure shown in Figure 6 constitutes an elevating mechanism for the regulating wheel and when adjusted, the regulating wheel support moves about the axis 122. This structure comprises a roller 131 which is journaled on a shaft 132 carried by the bed 10 of the machine. The periphery of the roller is concave in cross section and a wedge 133 carried on the underside of the support 103 is similarly shaped so that when the support 103 is oscillated about the axis 130 no change in the height of the regulating wheel will be effected.

The wedge 133 carries a nut 134 which is engaged by an adjusting screw 135 anti-frictionally journaled at 136 in a bracket 137 carried by the support 103. A manually operable hand wheel 138 is keyed to the end of the screw 135 for effecting manual adjustment thereof.

It will be obvious that upon movement of the wedge 133 toward the right as viewed in Figure 6, that the regulating wheel will be raised toward the work, and upon movement in the other direction it will be retracted from the work.

In setting up the machine the two outboard work supports are relatively adjusted and positioned to determine the axis that a work piece, such as 28, will travel through the grinding throat of the machine. In order to understand the relative angular relationship of the grinding wheels and the work, a graphical representation of the angular relationship of the different planes in which the various parts move is presented in Figure 8.

In this figure, the reference numeral 139 indicates a horizontal plane and the reference numeral 140 indicates an inclined plane. The intersection of the planes is indicated by the line 141. The inclined plane 140 is the plane in which the work moves in its travel through the grinding throat of the machine. The work, however, does not travel in the plane 140 along a path perpendicular to the element 141 which would be along a path indicated by the line 142, but at a small angle with respect thereto and represented by the line 143. The grinding wheel axis 144 and the regulating wheel axis 145 are, however, arranged to lie parallel to the line 142 with the result that the work crosses both wheel faces at a small angle, varying from four to ten degrees and which is known as the feed angle.

It will be noted from Figure 3 that the work piece 28 lies in front of a line 146 which connects the centers of rotation of the grinding and regulating wheels. This is for the purpose of making it possible for the machine to round up work with greater facility than would be possible if the work was closer to the line 146. It is desirable, of course, that each wheel make line contact with the work throughout the width of the wheel, and in spite of the fact that the work crosses the periphery of the wheel at an angle thereto. In order to accomplish this, the truing tool is passed across the face of the grinding wheel along a path indicated by the line 147 in Figure 8, which is substantially parallel in all respects to the axis of the work. The same thing is true of the regulating wheel with the result that both wheels will have a concave periphery when viewed in cross section.

Thus, each abrasive wheel is trued to provide a straight line of contact which extends diagonally across the face of the wheel. Since there is apt to be a variation between the angle of inclination of the work and the angle of inclination of the contact line on the wheels, the adjustment of the wheels about the axes 82 and 130 is provided whereby it becomes possible by adjusting the plane of rotation of the wheels to bring the line of contact on the wheels into parallelism with the axis of work travel. By providing the foregoing adjustments for the two-wheel supports it becomes possible to move either wheel toward and from the axis of the work to compensate for wear and other operating purposes, and to adjust the planes of rotation of the wheels to establish line contact with the work in such an angular relation that a rotative component will be exerted on the work to cause axial feed thereof, which component is assisted by the gravitational feed component resulting from the inclination of the work.

The two wheels may thus be adjusted to form a grinding throat which has an axis that is determined by the position of the axis of the work. A third element is necessary, however, to complete the formation of the grinding throat and this element is the work guiding blade 53 which is supported on the bed of the machine in the manner shown in Figure 11.

Figure 11:
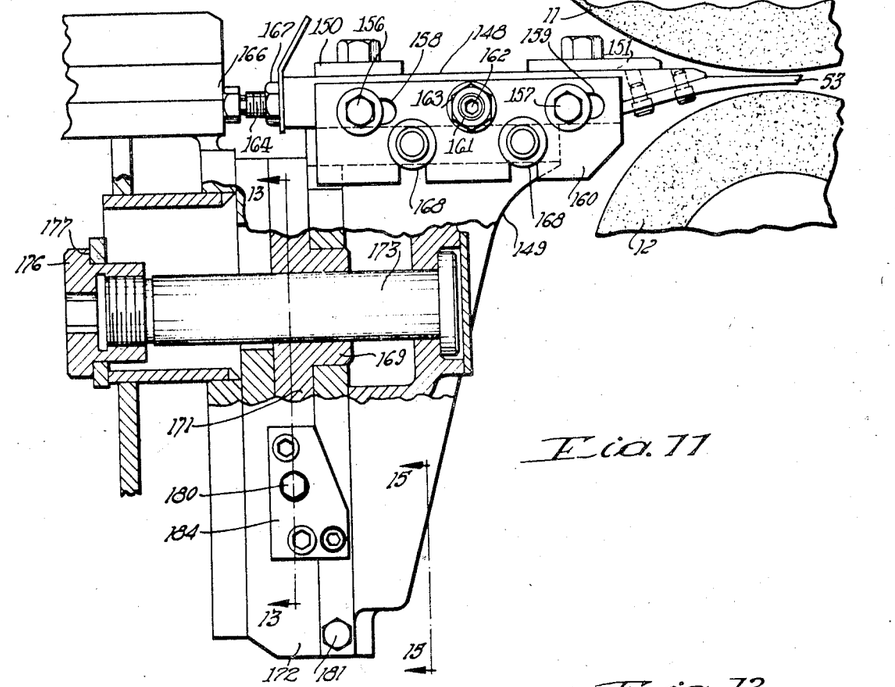
Figure 11 is an elevational view of the adjustable supporting means for the work guiding blade.
Figure 12:
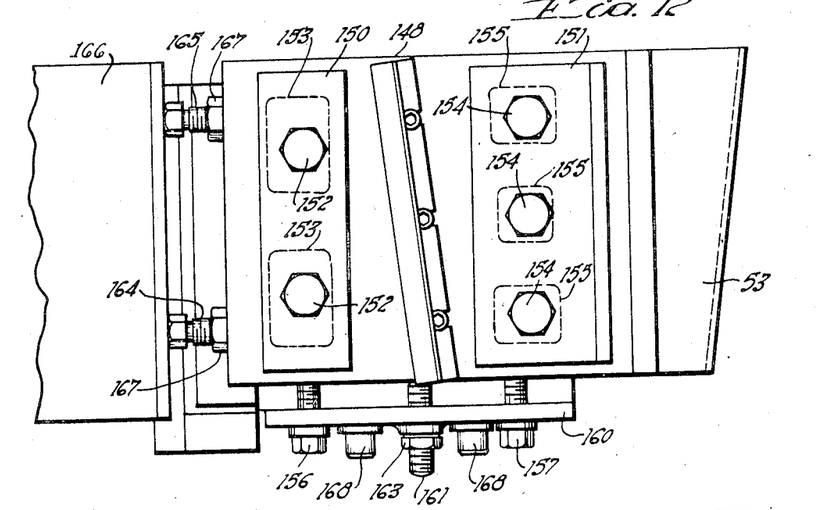
Figure 12 is a plan view of the structure shown in Figure 11.

Referring now to Figures 11 to 15 inclusive, the blade 53 is supported for adjustment in a plurality of directions to compensate for such items as change in work diameter, angle of work feed, or wear of the blade itself. As shown in Figure 11, the blade 53 is attached to a supporting plate 148. The plate 148 is supported on the top of an angle bracket 149 and secured thereto by a pair of clamping plates 150 and 151.

The bolts 152 which pass through the clamping plate 150 and are threaded into the angle bracket 149 pass through enlarged holes 153 formed in the plate 148. Similarly, the clamping bolts 154 which pass through the plate 151 and are threaded in the top of the angle bracket, also pass through enlarged holes 155 formed in the plate 148. These enlarged holes permit the plate 148 to be universally adjusted in the plane of the top of the angle bracket 149. One of these adjustments is effected by two bolts 156 and 157, which pass through elongated holes 158 and 159 formed in a side plate 160, and are threaded into the plate 148. The side plate 160 also carries a threaded stud 161 which is threaded into the side plate midway between the bolts 156 and 157 and engages the side of plate 148 to act as a pivot for angular adjustment of the plate 148.

The stud 161 has a hexagonal shaped socket 162 formed in the end thereof as shown in Figure 11 for receiving a wrench whereby the stud may be adjusted to adjust the blade 53 longitudinally of the work. A lock nut 163 is threaded on the stud for locking it in any given position. After the longitudinal adjustment of the blade 53 has been effected, the bolts 156 and 157 are reversely rotated to effect the desired angular adjustment of the blade. These two adjustments are effected while the bolts 152 and 154 are loose and may be effected regardless of the position of the blade toward or from the axis of the grinding throat due to the elongated slots 158 and 159 and the enlarged holes formed in the supporting plate 148. This adjustment toward and from the grinding throat may be effected by a pair of screws 164 and 165 threaded in the rear of the plate 148 but, as a practical matter, after the necessary adjustments have been made by the means carried by the side plate 160, the bolts 164 and 165 are rotated in a direction to engage the solid support 166 to thus serve as backing up bolts for the plate 148. The lock nuts 167 are then tightened, after which the bolts 152 and 154 are tightened to secure the blade 53 against movement in two directions.

The side plate 160 is secured to the angle bracket 149 by a pair of locking screws 168 which pass through elongated slots in the side plate 160, the elongated slots extending in a direction whereby the plate 148 and attached side plate 160 may be elevated with respect to the angle bracket so that shim plates of different thicknesses may be inserted between the plate 148 and the top of the bracket for effecting major vertical adjustments of the blade 53.

Figure 13:
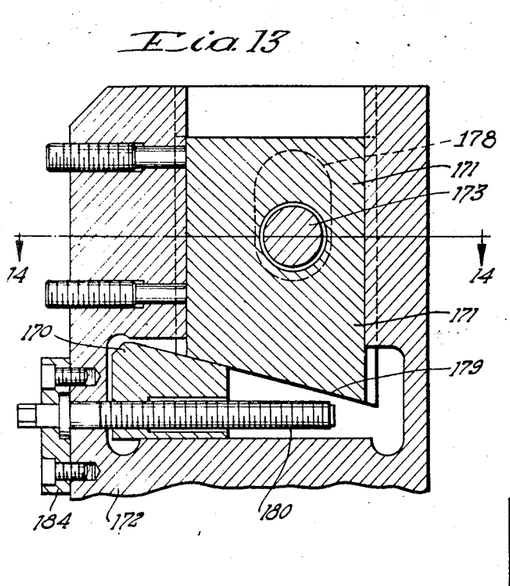
Figure 13 is a section on the line 13—13 of Figure 11.

In addition to the adjustments which may be effected by the means carried by the top of the angle bracket, the bracket itself is supported for rotational adjustment about a boss 169 and for vertical adjustment by a cam 170 shown in Figure 13.

Figure 14:
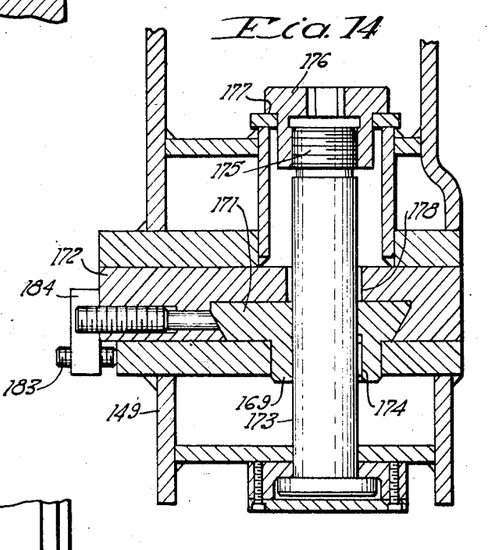
Figure 14 is a section on the line 14—14 of Figure 13.

The boss 169, as shown in Figure 14, is carried by a slide 171 which is V-guided in the fixed support 172. The bracket 149 carries a clamping bolt 173 which passes through the center of the boss 169 and is keyed thereto by a key 174. The bolt 173 has a threaded end 175 for receiving a clamping nut 176, the clamping nut having a flange 177 which engages the solid support 172. The bolt 173 passes through an elongated slot 178 formed in the solid support 172 whereby the angle bracket may be vertically adjusted. The key serves to hold the bolt 173 against rotation during rotation of the locking nut 176.

Vertical adjustment is effected by the cam 170 which engages the beveled face 179 formed on the bottom of the slide 171 by rotating screw 180 which is held against axial movement in the fixed support 172 and threaded in the cam member 170. Thus, when the locking bolt 176 is loosened and the screw 180 rotated, the slide 171 will be raised or lowered to effect raising or lowering of the work guiding blade 53.

Figure 15:
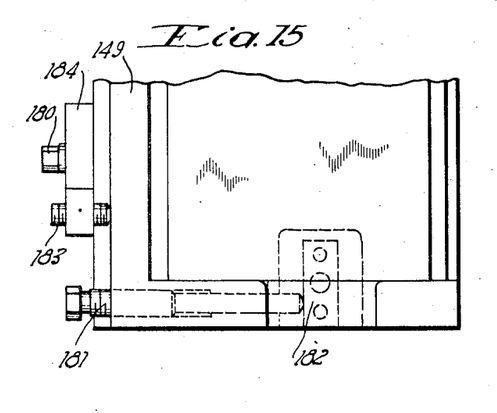
Figure 15 is a view on the line 15—15 of Figure 11.

The angular adjustment of the bracket 149 is effected by an adjusting screw 181 which, as shown in Figure 15, is carried by the bracket 149 for engagement with a fixed stop 182. A second adjusting screw 183 is threaded in the plate 184 fixed to the support 172 whereby rotation of the screw in one direction will effect counterclockwise rotation of the bracket 149, and rotation of the screw 181 in the same direction will effect clockwise rotation of the bracket 149. When adjustment is to be effected one of these screws is backed off and the other advanced to effect the necessary adjustment. The first screw is then tightened to lock the parts.

The blade 53 is thus capable of angular adjustment with respect to both a vertical and horizontal plane, of major vertical adjustments by shim plates, of minor vertical adjustments by the cam 170, and universal adjustment in a horizontal plane.

The means for adjusting the planes of rotation of the grinding and regulating wheels are located at the rear of the machine as shown in Figure 3, and since this is a rather inconvenient location, means have been provided as shown in Figures 9, 16, 17 and 18 whereby this adjustment may be power effected and conveniently controlled from the front of the machine.

The power adjusting mechanism is more particularly shown in Figure 16 and comprises a gear box 185 which is mounted on top of the frame 77 and in which is journaled a worm 186 driven by a motor 187. The worm 186 rotates a worm gear 188 which, in turn, drives a pair of intermeshing spur gears 189 and 190. The spur gear 190 is keyed to a shaft 191 which also has keyed thereto a shiftable clutch member 192. The clutch member when shifted upward, as viewed in Figure 16, intermeshes with clutch teeth formed on the face of spur gear 193 and when shifted downward intermeshes with clutch teeth formed on the face of spur gear 194. The gear 193 driven through idler 195, a spur gear 196 which is pinned to an elongated shaft 197.

This shaft has a squared end 198 which interfits in a square socket formed in the upper end of nut 127. The spur gear 194 meshes directly with a spur gear 199 which has a threaded connection with the end of screw 72. It will now be seen that when the clutch member 192 is shifted upward the plane of rotation of the regulating wheel will be angularly adjusted through axial movement of bolt 128 and when shifted downward the plane of rotation of the grinding wheel will be similarly effected through the screw 72.

The clutch member 192 is provided with a shifter fork 200 which is pivoted at 201 as shown in Figure 17 and connected to armature 202 and 203 of operating solenoids 204 and 205 respectively.

The electric motor 187 is a three-phase reversible motor and as shown in Figure 9 a switch 206 is provided for connecting the motor to the power mains 207, 208 and 209 for effecting one direction of rotation, and a second switch 210 is provided for connecting the motor in a reverse relation to the power mains for effecting an opposite direction of rotation thereof.

The switch member 206 is operated by a closing coil 211 while the switch 210 is operated by a closing coil 212. The ends 213 and 214 of the closing coils respectively are connected to the power main 207 through line 215, thermal relays 216 and 217, and branch line 218. The other ends of the closing coils are connected for control by an H-slot control lever 219 which may be mounted on a pedestal 220 located at the front of the machine as shown in Figure 2. This lever is shiftable into four different positions for actuating limit switches 221, 222, 223 and 224 which are located with respect to the lever in the positions shown in Figure 18. Each limit switch determines a direction of rotation of the motor 187, and also actuation of one of the solenoids 204 or 205.

Thus, when the lever is thrown to a given position, it starts rotation of the motor 187 in a determined direction and then shifts the clutch member 192 into a definite position for connecting the motor for adjustment of one or the other of the abrasive wheels. The limit switch 221 has a pair of contacts 225 and 226 which when closed connect the power main 209 to one end of the closing coil 212 through line 227, the other end of the closing coil being connected as previously mentioned to power main 207. The switch also has a second pair of contacts 228 and 229 which when closed connect the power main 209 through lines 230 and 231 to the end of solenoid 204, the other end being permanently connected through line 232 to power main 207. If the lever 219 is shifted downward it will close limit switch 224 and thereby interconnect contacts 233 and 234 which are connected in parallel with the contacts 228 and 229 whereby the clutch solenoid 204 will still remain energized.

At the same time, however, contacts 235 and 236 will be interconnected, thereby energizing the starting coil 211 and deenergizing starting coil 212 due to the opening of limit switch 221. In a similar manner the limit switch 222 has a first pair of contacts 237 and 238 which when closed will energize the starting coil 212; and a pair of contacts 239 and 240 which when closed will energize solenoid 205.

Limit switch 223 has a pair of contacts 241 and 242 which when closed energize starting coil 211 and a second pair of contacts 243 and 244, which energize solenoid 205. It will thus be apparent that by use of control lever 219 angular adjustment of the plane of rotation of either abrasive wheel may be effected and in either a clockwise or a counterclockwise direction from the front of the machine.

The pedestal 220 also carries the push button controls 245 and 246 for the wheel motors 56 and 104, and the air valves 247 and 248 for controlling the lifting of the work guides whereby a work piece may gravitate into the lead-in work drum or gravitate off of the lead-out work drum after it has cleared the machine.

There has thus been provided an improved centerless bar grinding machine in which the axis of movement of the work is positively determined by means outside of the grinding throat, and means are provided for adjusting the grinding wheel, regulating wheel and work rest blade in a manner to cause them to converge about the work in a manner to form a grinding throat having an axis co-incidental with the axis of the work; and in which the feed axis of the work is inclined to a horizontal plane to thereby impart a gravitational feed component thereto in a manner to assist the feed component developed in the grinding throat by the grinding and regulating wheels.

We claim:

1. In a centerless grinding machine having a grinding wheel, a regulating wheel and a work guiding blade forming a grinding throat having an axis lying in a plane inclined to the horizontal, the combination of a three-point support for the grinding wheel comprising an anchored universal joint, a pivoted trunnion having an axis passing through said universal joint, elevating means connected to the grinding wheel support and lying in an axis which passes through a central plane of the wheel and said universal joint, means to oscillate the support about one of said axes to change the plane of rotation of the wheel, and means to actuate said elevating means to feed the grinding wheel toward or from the work.

2. In a centerless grinding machine having a grinding wheel, the combination with means independent of the machine for determining the path of movement of a work piece past the grinding wheel, the combination of means for supporting a regulating wheel on the side of the work opposite the grinding wheel, said supporting means having three points of support lying on intersecting axes, one of said axes passing through a central plane of the wheel. means to oscillate said supporting means about one of said axes to move the regulating wheel into peripheral contact with the work, and means to oscillate said supporting means about the other axes to align the line of contact of the face of the regulating wheel parallel to the axis of feed of the work.

3. In a centerless grinding machine, having means for guiding a work piece through the machine in a plane inclined to a horizontal plane, the combination of a grinding wheel, a regulating wheel, means for supporting said wheels for rotation about axes lying in a plane perpendicular to the line of intersection between the horizontal and inclined planes, the path of movement of the work being angularly related to said line of intersection, said wheels being trued to provide a straight line of contact parallel to the path of movement of the work, means to move the respective wheels into contact with the work and additional means for adjusting the plane of rotation of the respective wheels to adjust the trued line of contact thereof into parallelism with an element of the cylindrical surface of the work.

4. In a grinding machine having spaced grinding and regulating wheels, the combination of a work guiding blade, a fixed support therefor, intervening means for supporting the blade on said support including a first swiveling means for determining the angle of the blade in one plane, and a second swiveling means for determining the angle of the blade in a second plane at right angles to the first-named plane.

5. In a grinding machine having a support, and spaced grinding and regulating wheels mounted on said support, the combination of a work guiding blade, means to support the blade on said support and intermediate said wheels including an angle bracket, a dovetailed slide reciprocably mounted on the support, said slide carrying a boss supporting the angle bracket for swivel adjustment, a side plate carried by the angle bracket, a supporting plate for said blade mounted on the angle bracket, means carried by the side plate for effecting angular adjustment of the supporting plate to align the blade parallel to the travel of the work, and means to positively lock the blade in said position 6. In a centerless grinder having a supporting frame and a pair of opposed grinding and regulating wheels, the combination of means for supporting the wheels on said frame for angular adjustment of their planes of rotation, pairs of cooperating threaded members for effecting angular adjustment of the respective wheels, a power operable member, and means to selectively connect said member for effecting relative movement between the members of one of said pairs of threaded members to effect said angular adjustment.

7. In a centerless grinder having a supporting frame and a pair of opposed grinding and regulating wheels, the combination of means for supporting the wheels on said frame for angular adjustment of their planes of rotation, pairs of cooperating threaded members for effecting the respective angular adjustments, a power operable member, means to selectively connect said power member for effecting relative movement between the members of one of said pairs of threaded members to effect said angular adjustment, and means to change the direction of said relative movement.

8. In a centerless grinder having a supporting frame, a pair of opposed grinding and regulating wheels mounted thereon, means for supporting said wheels on the frame for angular adjustment of their planes of rotation including a pair of cooperating threaded members associated with each wheel for effecting adjustment thereof, a prime mover, motion transmitting trains extending to each pair of threaded members, a power operable selector for selectively connecting the prime mover to either train, a control member, and means operable thereby for determining the direction of rotation of said prime mover and for actuating said selector.

9. In a centerless grinder having a grinding wheel and a regulating wheel, the combination of an adjusting mechanism for each wheel for angularly changing the plane of rotation thereof, a power train extending to each mechanism, a prime mover, an electrically operated selector clutch for connecting the prime mover to said trains, a reverser for said prime mover, a common control for said reversing means and for said clutch operating means, said control having a neutral position, and a plurality of other positions for determining the adjusting mechanism to be actuated and its direction of actuation.

10. A grinding machine having a bed, a grinding wheel head supported at three points on the bed, said three points determining a plane inclined to the horizontal, a regulating wheel support supported at three points on the bed, said three points determining a plane inclined to the horizontal, a prime mover carried by the head for driving the grinding wheel, a second prime mover carried by the regulating wheel support for driving the regulating wheel, means external of the bed for guiding work past said wheels at an inclination to a horizontal plane and in an angular relation to the axis of rotation of said wheels, means to adjust one point of support of both the grinding wheel and the regulating wheel to advance the wheels toward the work, and additional means for adjusting a second point of support of both of said wheels for angularly adjusting the planes of rotation thereof to establish a line of contact with the work parallel to the axis of movement thereof.

11. In a long bar centerless grinder, the combination with opposed grinding and regulating wheels and a work guiding blade adapted to form a grinding throat, of a lead-in work support and a lead-out work support mounted on opposite sides of said grinding throat, rotatable drums supported on each work support, a storage rack associated with the lead-in work support and inclined toward the drum whereby work will move by gravity from the rack to the drum, power operated means for controlling movement of the work onto the drum, means to rotate the drum to cause axial feeding of the work past the grinding wheel, and additional means for controlling movement of the work from the receiving drum to the receiving rack.

12. In a long bar centerless grinder, the combination with opposed grinding and regulating wheels and a work guiding blade adapted to form a grinding throat, of a lead-in work support and a lead-out work support mounted on opposite sides of said grinding throat, rotatable drums supported on the work supports, a storage rack associated with the lead-in work support and inclined toward the drum carried thereby whereby work will move by gravity from the rack to the drum, power operated means for controlling movement of the work onto the drum, means to rotate the drum to cause axial feeding of the work, additional means for controlling movement of the work from the receiving drum to the receiving rack, and means to adjust said work supports to raise or lower the axis of the work with respect to the supporting frame of the grinding wheel.

13. A machine of the character described, including a central wheel supporting portion and lateral work supporting members and said lateral members having parallel ways disposed at different elevations, and substantially triangular work piece supporting members slidably mounted on said ways for movement in a direction toward and from the wheel supporting section, and work supporting devices mounted on said members and adjustable into axial alignment for support of an elongated work piece during its passage through the wheels.

14. A machine of the character described, including a central wheel supporting portion and lateral work supporting members and said lateral members having parallel ways disposed at different elevations, and substantially triangular work piece supporting members slidably mounted on said ways for movement in a direction toward and from the wheel supporting section, and work supporting devices mounted on said members and adjustable into axial alignment for support of an elongated work piece during its passage through the wheels, said wheels including a first regulating wheel member subtending the support determined axis for the work piece and an overlying grinding wheel, and means for effecting individual positioning movements of the respective wheels with respect to the intermediate support determined work piece axis.

15. A machine of the character described, including a central wheel supporting portion and lateral work supporting members and said lateral members having parallel ways disposed at different elevations, and substantially triangular work piece supporting members slidably mounted on said ways for movement in a direction toward and from the wheel supporting section, and work supporting devices mounted on said members and adjustable into axial alignment for support of an elongated work piece during its passage through the wheels, said wheels including a first regulating wheel member subtending the support determined axis for the work piece and an overlying grinding wheel, means for effecting individual positioning movements of the respective wheels with respect to the intermediate support determined work piece axis, and an independently adjustable work rest member carried by the wheel supporting unit for movement in a direction toward and away from the said support determined work piece axis, whereby accurate three-point engagement of a work piece between grinding and regulating wheels and support blade may be effected without distortion of the work piece from its support-determined axis.

16. In a machine of the character described including a work supporting member for determining the axis of a work piece during performance of a centerless grinding operation thereon, abutment members disposed adjacent said work supporting member for preventing axial deflection of a work piece mounted thereon, a work supporting rack adjacent said potential work supporting member, a plurality of retractable lateral work engaging abutments and means for selectively shifting said abutments into retracted position permitting lateral interchange of a work piece between the rack and work support or into projected position, retaining the work piece on the support in opposition to the first-mentioned abutments to cooperate therewith in preventing said axial deflection of the work.

GEORGE W. BINNS.
BERNARD A. KEARNS.